2,949,478

PROCESS OF CLEAVING 9,11 OXIDO STEROIDS WITH ALCOHOLS AND ORGANIC ACIDS

Josef Fried, New Brunswick, N.J., assignor to Olin Mathieson Chemical Corporation, New York, N.Y., a corporation of Virginia No Drawing. Filed July 29, 1954, Ser. No. 446,667

6 Claims. (Cl. 260—397.45)

This application is a continuation-in-part of my application Serial No. 343,243, filed March 18, 1953, and now abandoned.

This invention relates to the synthesis of valuable steroids, and more particularly, to the synthesis of steroid derivatives having an oxy substituent in the 9α-position.

One of the objects of this invention is the provision of certain steroids of the pregnane (including the pregnene, and allopregnane) series useful in the preparation of other physiologically-active steroids and also useful for their own physiological action.

The compounds of this invention comprise steroids of the pregnane series having a 9α-MO substituent, and an 11-keto or 11β-hydroxy substituent, M being a member of the group consisting of hydrogen, a hydrocarbon radical and an acyl radical. Specifically preferred compounds are those wherein M is a member of the group consisting of hydrogen, lower alkyl, and lower alkanoyl.

The process of this invention essentially comprises converting a 9β,11β-oxido steroid, prepared by the methods disclosed hereinafter and in Serial No. 343,243 and my continuation-in-part thereof, Serial No. 417,489, filed March 10, 1954, now Patent No. 2,852,511, into the corresponding 9α-MO, 11β-hydroxy steroid; the latter may then be oxidized to the corresponding 11-keto derivative.

Among the compounds of this invention are those of the general formula:

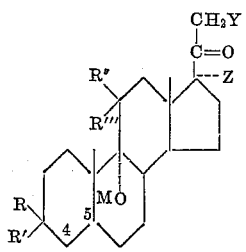

wherein the 4,5 position is double-bonded or saturated (a double bond being preferred), and R is —H, R' is —OH, or together R and R' is =O or a group convertible thereto by hydrolysis (R and R' as keto being preferred), R" is H, R''' is β-OH, or together R" and R''' is =O, M is hydrogen, a hydrocarbon radical (such as alkyl, alkenyl, aralkyl and cycloalkyl), or an acyl radical (such as alkanoyl, aralkanoyl, aromatic acyl, cycloalkyl acyl, alkyl-sulfonyl, aralkyl-sulfonyl, aromatic sulfonyl, and cycloalkyl-sulfonyl), Y is —H, halogen, —OH, or —O-(acyl), and Z is —H, or α-OH. The preferred compounds are those wherein M is a hydrogen, lower alkyl, or a lower alkanoyl radical.

The steroids of the pregnane series having a 9α-MO substituent and an 11-keto or 11β-hydroxy substituent, contrary to what would have been predicted, possess corticoid activity in a liver glycogen assay.

The 9β,11β-oxido compounds used as starting materials in the process of this invention are prepared from the corresponding 9α-bromo-11β-hydroxy derivatives as disclosed in Serial Nos. 343,243 and 417,489, by reacting said 9α-bromo-11β-hydroxy derivatives with a suitable reagent. Reagents useful in this connection include, inter alia, the alkali metal salts of lower alkanoic acids (e.g. potassium acetate, sodium propionate, potassium butyrate), alkali metal carbonates (e.g. potassium bicarbonate, sodium carbonate, and sodium bicarbonate), and alkalis (e.g. potassium hydroxide and sodium hydroxide).

The conversion of the 9β,11β-oxido compounds to the desired 9α-MO,11β-hydroxy compounds may be effected by reacting said oxido compound with a compound of the formula MOH, wherein M is as above defined. Suitable compounds of the formula MOH, useful for the purposes of the invention, include, inter alia, water; alcohols, such as lower alkanols (e.g. methanol, ethanol, n-propanol, and n-butanol), aralkanols (e.g. benzyl alcohol and 2-phenylethanol), alkenols (e.g. vinyl alcohol and 3-butenol-1), and cycloalkanols (e.g. cyclohexyl alcohol and cyclopentyl alcohol); carboxylic acids, such as lower alkanoic acids (e.g. acetic acid and propionic acid), aralkanoic acids (e.g. phenylacetic acid and hydrocinnamic acid), alkenoic acids, aromatic carboxylic acids (e.g. benzoic acid and naphthoic acid), and cycloalkyl carboxylic acids; the thione analogs of these carboxylic acids; sulfonic acids, such as lower alkane sulfonic acids (e.g. methane sulfonic acid, ethane sulfonic acid), aralkane sulfonic acids, alkene sulfonic acids, aromatic sulfonic acids (e.g. benzene sulfonic acid, toluene sulfonic acid, and naphthalene sulfonic acid), and cycloalkane sulfonic acids.

The reaction may be carried out at various temperatures, the range of room temperature to reflux being suitable. The reaction may be carried out either in the absence of a solvent or in a suitable solvent such as dioxane, acetone, tetrahydrofuran, etc. The use of a solvent is preferred when both reactants are solids, or when the oxido steroid is not soluble in the second reactant as is the case when MOH is water. The resulting product is isolated from the reaction mixture by methods known in the art.

The reaction is preferably carried out in the presence of a strong acid. Although strong acids such as sulfuric and nitric are utilizable, the acids employed are preferably those which do not form esters with the 11β-hydroxy and include such acids as perchloric, p-toluene sulfonic, and trichloracetic acid. Of these, perchloric acid is particularly preferred.

The 9α-MO,11β-hydroxy steroids obtained in the practice of this invention may be oxidized to the corresponding keto compounds by conventional oxidizing procedures, e.g. chromic acid in glacial acetic acid.

Among the 9β,11β-oxido steroids of the pregnane series utilizable in the process of this invention are 9β,11β-oxido-progesterone, 9β,11β-oxido-21-hydroxy-progesterone, 9β,11β-oxido-17α-21-dihydroxy-progesterone, 9β,11β-oxido-17β-hydroxy-progesterone, and in the cases wherein there is present a 21-hydroxy radical, the acyl derivatives thereof. The last are exemplified by the lower alkanoyl esters (e.g. acetyl, propionyl, and butyryl), the aromatic esters (e.g. benzoyl and naphthoyl), and the sulfonyl esters (e.g. methane sulfonyl, ethane sulfonyl and benzene sulfonyl).

For a clearer understanding of the foregoing general and following detailed description of the invention, reference is made to the following schematic analysis (proceeding from the 9α-bromo-11β-hydroxy steroid of the pregnane series, the derivation of this starting material being the subject of the aforementioned applications, Serial No. 343,243 and No. 417,489):

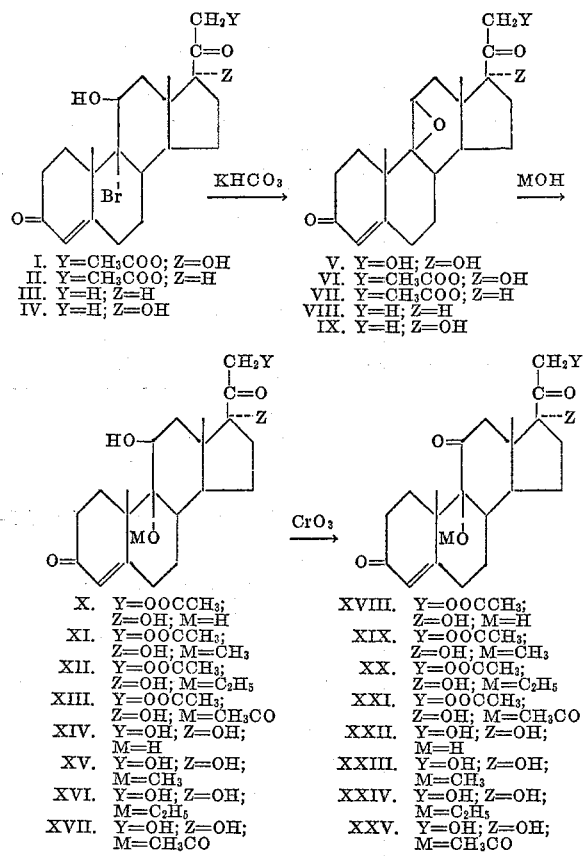

I. Y=CH₃COO; Z=OH
II. Y=CH₃COO; Z=H
III. Y=H; Z=H
IV. Y=H; Z=OH

V. Y=OH; Z=OH
VI. Y=CH₃COO; Z=OH
VII. Y=CH₃COO; Z=H
VIII. Y=H; Z=H
IX. Y=H; Z=OH

X. Y=OOCCH₃; Z=OH; M=H
XI. Y=OOCCH₃; Z=OH; M=CH₃
XII. Y=OOCCH₃; Z=OH; M=C₂H₅
XIII. Y=OOCCH₃; Z=OH; M=CH₃CO
XIV. Y=OH; Z=OH; M=H
XV. Y=OH; Z=OH; M=CH₃
XVI. Y=OH; Z=OH; M=C₂H₅
XVII. Y=OH; Z=OH; M=CH₃CO

XVIII. Y=OOCCH₃; Z=OH; M=H
XIX. Y=OOCCH₃; Z=OH; M=CH₃
XX. Y=OOCCH₃; Z=OH; M=C₂H₅
XXI. Y=OOCCH₃; Z=OH; M=CH₃CO
XXII. Y=OH; Z=OH; M=H
XXIII. Y=OH; Z=OH; M=CH₃
XXIV. Y=OH; Z=OH; M=C₂H₅
XXV. Y=OH; Z=OH; M=CH₃CO

The following examples are illustrative of the invention, preliminary Examples A–E illustrating the preparation of the 9β,11β-oxide starting compounds, and Examples 1–6 illustrating preparation of the final 9α-MO steroids of this invention (all temperatures being in centigrade):

EXAMPLE A

Δ⁴-pregnene-9β,11β-oxido - 17α, 21 - diol-3,20-dione (V) from 9α-bromo-Δ⁴-pregnene-11β,17α,21-triol-3,20-dione 21-acetate (I)

To a solution of 115 mg. 9α-bromo-Δ⁴-pregnene-11β,17α,21-triol-3,20-dione 21-acetate (obtainable as described in Example 1 of said application Serial No. 417,489) in 10 ml. methanol is added a solution of 103 mg. potassium bicarbonate in 1 ml. water. The resulting solution is allowed to remain at room temperature for 18 hours, after which time 4 ml. water is added, and the solution is freed from methanol in vacuo. Chloroform is added to the residue, and after mixing and separation of the layers, the chloroform solution is washed with water and dried over sodium sulfate. Evaporation of the solvent leaves a residue (about 82 mg.) which crystallizes readily from acetone. The pure Δ⁴-pregnene-9β,11β-oxido-17α,21-diol-3,20-dione has the following properties: M.P., about 206–208° C.; $[\alpha]_D^{22}$ +23° (c., 0.75 in CHCl₃)

$\lambda_{max}^{alc.}$ 243 mμ (ε=13,700)

Analysis.—Calculated for C₂₁H₂₈O₅: C, 70.02; H, 7.77. Found (approximately): C, 70.39; H, 7.95.

EXAMPLE B

Δ⁴-pregnene-9β,11β-oxido - 17α,21 - diol-3,20-dione acetate (VI) from 9α-bromo-Δ⁴-pregnene-11β,17α,21-triol-3,20-dione 21-acetate (I)

A solution of 2.5 g. of 9α-bromo-Δ⁴-pregnene-11β,17α, 21-triol-3,20-dione 21-acetate and 6.25 g. potassium acetate in 190 absolute alcohol is refluxed for 50 minutes. After the addition of 20 ml. water, the solution is concentrated in vacuo to incipient crystallization. Water is again added (50 ml.) and the crystallization is completed in the refrigerator. The first crop (about 1.31 g.) melts at about 209.5–10.5°; and a second crop (about 291 mg.), melting at about 206–98°, is obtained on concentration of the mother liquors. The analytically pure material obtained by crystallization from acetone, melts at about 210–12° and has $[\alpha]_D^{23}$ +41° (c., 0.70 in CHCl₃)

$\lambda_{max}^{alc.}$ 243 mμ (ε=15,500)

Its approximate analysis (calculated for C₂₃H₃₀O₆: C, 68.63; H, 7.51): C, 69.02; H, 7.42.

EXAMPLE C

Δ⁴-pregnene-9β,11β-oxido - 21 - ol-3,20-dione 21-acetate (VII) from 9α-bromo-corticosterone acetate (II)

A solution of 253.8 mg. of 9α-bromocorticosterone acetate (obtainable as described in Example 3 of application Serial No. 417,409) and 625 mg. of anhydrous potassium acetate in 18 ml. of absolute alcohol is refluxed for 50 minutes. After the addition of 10 ml. of water, the alcohol is evaporated in vacuo, and the residual aqueous suspension extracted with chloroform. The chloroform solution is washed with water, dried over sodium sulfate, and evaporated to dryness in vacuo. The residue (about 205 mg.), an oil which does not crystallize, is Δ⁴-pregnene-9β,11β-oxido-21-ol-3,20-dione 21-acetate.

EXAMPLE D

9β,11β-oxido progesterone (VIII) from 9α-bromo-11β-hydroxy-progesterone (III)

103 mg. 9α-bromo-11β-hydroxy progesterone (obtainable as described in Example 2 of application Serial No. 417,489) is treated with 250 mg. of potassium acetate as described in Example B. The resulting amorphous product, 9β,11β-oxido progesterone (about 90.6 mg.), cannot be crystallized even after chromatography, and is therefore used in the examples hereinafter without further purification.

EXAMPLE E

Δ⁴-pregnene-9β,11β-oxido-17α-ol-3,20-dione (IX) from 9α-bromo-11β,17α-dihydroxy-progesterone (IV)

A solution of 247 mg. of 9α-bromo-11β,17α-dihydroxy-progesterone (obtainable as described in Example 19 of application Serial No. 417,489) and 630 mg. of anhydrous potassium acetate is refluxed for 90 minutes. The reaction mixture is worked up as described in Example A. The resulting crude residue is recrystallized from acetone-hexane yielding pure Δ⁴-pregnene-9β,11β-oxido-17α-ol-3,20-dione of the following properties: M.P. 197–199° C., $[\alpha]_D^{23}$ +6° (c., 0.32 in chloroform);

$\lambda_{max}^{alc.}$ 243 mμ (ε=15,200), 283 mμ (ε=630); $\lambda_{max}^{Nujol}$ 2.86μ, 3.05μ (OH), 5.89μ (20-CO), 6.04μ (Δ⁴-3-ketone)

Analysis.—Calcd. for C₂₁H₂₈O₄ (344.44): C, 73.22; H, 8.18. Found: C, 72,99; H, 8.11.

EXAMPLE 1

9α-hydroxyhydrocortisone acetate (X)

A solution of 408 mg. of Δ⁴-pregnene-9β,11β-oxido-17α,21-diol-3,20-dione 21-acetate (VI) in a mixture containing 24 ml. of dioxane, 4 ml. of 1.1 N sulfuric acid and 60 ml. of water is refluxed for 45 minutes. During this period of time the rotation of the solution changes from an initial value of +41° to a value of 149°. The addition of 40 ml. of chloroform causes separation of phases, and after separating off the water layer, the dioxane-chloroform (lower) layer is washed with water, dilute sodium bicarbonate solution and again with water. The washed extract is dried over sodium sulfate and evaporated to dryness in vacuo. The crude residue (about 417 mg.) is acetylated with 2 ml. of acetic anhydride and 2 ml. of pyridine for 1½ hours. Evaporation of the acetylating reagents in high vacuum leaves a residue (about 396 mg.) which is chromatographed on 7 g. of silica gel. Elution of the chromatogram with chloroform (800 ml.) affords a fraction (about 110 mg.) which after several recrystallizations from acetone-hexane melts at 218–219° C. It represents a $\Delta^x$-dehydrohydrocortisone acetate. $[\alpha]_D^{23}$ +104° (c., 0.49 in chloroform);

$\lambda_{max.}^{alc.}$ 241 m$\mu$ ($\epsilon$=15,400); $\lambda_{max.}^{Nujol}$ 3.01$\mu$, 5.80$\mu$, 5.91$\mu$, 5.96$\mu$, 6.00$\mu$.

Analysis.—Calcd. for $C_{23}H_{30}O_6$: C, 68.63; H, 7.51. Found: C, 68.72; H, 7.26.

This substance shows about 0.4 times the activity of cortisone acetate in the rat liver glycogen assay.

Further elution of the chromatogram with 10% acetone in chloroform yields in the first 125 ml. a mixture which cannot be readily separated by crystallization. In the next 1000 ml. this same eluant affords a homogeneous crystalline fraction (about 110 mg.), which after recrystallization from acetone-hexane yields pure 9$\alpha$-hydroxyhydrocortisone acetate having the following properties: M.P. 216–217° C.; $[\alpha]_D^{23}$ +149° (c., 0.89 in acetone);

$\lambda_{max.}^{alc.}$ 242 m$\mu$ ($\epsilon$=16,400); $\lambda_{max.}^{Nujol}$ 2.99$\mu$, 5.84$\mu$, 6.18$\mu$ Analysis.—Calcd. for $C_{23}H_{32}O_7$ (420.49): C, 65.69; H, 7.67. Found: C, 65.85; H, 7.57.

9$\alpha$-hydroxyhydrocortisone acetate is about 0.2 times as active as cortisone acetate in the rat liver glycogen assay.

9$\alpha$-hydroxyhydrocortisone acetate may also be produced by a modification of the process of the above example, by substituting perchloric acid for sulfuric acid and conducting the experiment at room temperature, rather than at reflux.

EXAMPLE 2

9$\alpha$-methoxyhydrocortisone acetate (XI)

To a solution of 200 mg. of $\Delta^4$-pregnene-9$\beta$,11$\beta$-oxido-17$\alpha$,21-diol-3,20-dione 21-acetate (VI) in 10 ml. of methanol is added 0.075 ml. of 72% perchloric acid. The mixture is allowed to stand at room temperature for 5 hours during which time the specific rotation rose from 0° to 145°. The mixture is drowned in an equal volume of water containing enough sodium bicarbonate to render the solution slightly basic, and the methanol is evaporated off in vacuo. The residual aqueous suspension is extracted with chloroform and the chloroform extract washed with water. Evaporation of the acetylating reagents in vacuo furnishes material which crystallizes readily from absolute alcohol, M.P. about 208–209° C.; $[\alpha]_D^{23}$ +156° (c., 0.80 in chloroform);

$\lambda_{max.}^{alc.}$ 243 m$\mu$ ($\epsilon$=14,800); $\lambda_{max.}^{Nujol}$ 2.84$\mu$, 3.04$\mu$, 5.70$\mu$, 5.80$\mu$, 6.10$\mu$, 6.20$\mu$ Analysis.—Calcd. for $C_{24}H_{34}O_7$: C, 66.34; H, 7.89; $OCH_3$, 7.14. Found: C, 65.91; H, 8.08; $OCH_3$, 7.28.

EXAMPLE 3

9$\alpha$-ethoxyhydrocortisone acetate (XII)

To a solution of 200 mg. of $\Delta^4$-pregnene-9$\beta$,11$\beta$-oxido-17$\alpha$,21-diol-3,20-dione acetate (VI) in 20 ml. of absolute ethanol is added 0.150 ml. of 72% perchloric acid and the mixture allowed to remain at room temperature for 72 hours. The reaction mixture is worked up and reacetylated as described in Example 2 for the methoxy compound. The resulting product (about 207 mg.) is recrystallized from acetone-hexane and yields about 95 mg. of the pure ethoxy derivative, M.P. about 144–145° C., $[\alpha]_D^{23}$ +133° (c., 0.62 in chloroform).

Analysis.—Calcd. for $C_{25}H_{36}O_7$: C, 69.94; H, 8.09; $OC_2H_5$, 10.03. Found: C, 66.94; H, 7.89; $OC_2H_5$, 8.43.

By substituting n-butanol and iso-butanol for methanol in Example 2, the corresponding 9$\alpha$-n-butoxyhydrocortisone acetate and 9$\alpha$-iso-butoxyhydrocortisone acetate are produced, respectively.

EXAMPLE 4

9$\alpha$-acetoxyhydrocortisone acetate (XIII)

To a solution of 300 mg. of $\Delta^4$-pregnene-9$\beta$,11$\beta$-oxido-17$\alpha$,21-diol-3,20-dione 21-acetate (VI) in 30 ml. of glacial acetic acid is added 0.225 ml. of 72% perchloric acid, and the mixture allowed to stand at room temperature for 5 minutes. After the addition of water and sufficient sodium bicarbonate to neutralize the perchloric acid, the solution is concentrated to near-dryness and extracted with chloroform. The chloroform residue is washed with dilute sodium bicarbonate and with water and dried over sodium sulfate. Evaporation of the chloroform in vacuo leaves a residue, which on recrystallization from alcohol melts at about 233–235° C. 9$\alpha$-acetoxyhydrocortisone acetate possesses about 0.5 times the activity of cortisone acetate in the liver glycogen assay.

9$\alpha$-acetoxyhydrocortisone acetate may also be produced by a modification of the process of the above example, by substituting sulfuric acid for perchloric acid and conducting the reaction at reflux temperature.

9$\alpha$-hydroxyhydrocortisone acetate (X), 9$\alpha$-methoxyhydrocortisone acetate (XI), 9$\alpha$-ethoxyhydrocortisone acetate (XII), and 9$\alpha$-acetoxyhydrocortisone acetate (XIII) may each be hydrolyzed with a dilute acid such as hydrochloric acid or a dilute base such as sodium hydroxide, to form the corresponding free 21-hydroxy derivative, namely, 9$\alpha$-hydroxyhydrocortisone (XIV), 9$\alpha$-methoxyhydrocortisone (XV), 9$\alpha$-ethoxyhydrocortisone (XVI), and 9$\alpha$-acetoxyhydrocortisone (XVII), respectively.

EXAMPLE 5

9$\alpha$-hydroxycortisone acetate (XVIII)

To a solution of 29.5 mg. of 9$\alpha$-hydroxy-hydrocortisone acetate (X) in 2 ml. of glacial acetic acid is added a solution of 5.76 mg. of chromic acid in 1.25 ml. of acetic acid. After 20 minutes, 1 ml. of methanol is added and the resulting mixture is concentrated in vacuo. The residue is distributed between chloroform and water and the resulting chloroform extract is washed with water, sodium bicarbonate solution and again with water. After drying over sodium sulfate and evaporation of the solvent in vacuo, the residue (about 21.2 mg.) on crystallization from 95% alcohol, yields pure 9$\alpha$-hydroxycortisone acetate having the following properties: M.P. about 237–239° C.; $[\alpha]_D^{23}$ +205° (c., 0.51 in chloroform);

$\lambda_{max.}^{alc.}$ 238 m$\mu$ ($\epsilon$=16,500); $\lambda_{max.}^{Nujol}$ 3.03$\mu$, 5.76$\mu$, 5.79$\mu$, 5.87$\mu$, 6.03$\mu$, 6.08$\mu$ Analysis.—Calcd. for $C_{23}H_{30}O_7$ (418.47): C, 66.01; H, 7.23. Found: C, 66.28; H, 7.37.

9$\alpha$-hydroxycortisone acetate may be saponified with dilute hydrochloric acid to form free 9$\alpha$-hydroxycortisone.

EXAMPLE 6

9$\alpha$-methoxycortisone acetate (XIX)

25 mg. of 9$\alpha$-methoxyhydrocortisone acetate is oxidized in 3 ml. of glacial acetic acid with 9.5 mg. of $CrO_3$ for 35 minutes, by the procedure described in Example 5. A crystalline residue results, which is recrystallized from acetone, M.P. about 243–245° C.; $[\alpha]_D^{23}$ +186° (c., 0.62 in chloroform);

$\lambda_{max.}^{alc.}$ 239 m$\mu$ ($\epsilon$=14,600); $\lambda_{max.}^{Nujol}$ 3.06$\mu$ 5.74$\mu$, 5.80$\mu$, 5.86$\mu$, 6.04$\mu$, 6.20$\mu$

*Analysis.*—Calcd. for $C_{24}H_{32}O_7$: C, 66.65; H, 7.36. Found: C, 66.42; H, 7.36.

In a similar manner, 9α-ethoxyhydrocortisone acetate, (XII), and 9α-acetoxyhydrocortisone acetate (XIII) are oxidized to 9α-ethoxycortisone acetate (XX) and 9α-acetoxycortisone acetate (XXI), respectively. Each of these acetates, as well as 9α-hydroxycortisone acetate (XVIII) and 9α-methoxycortisone acetate (XIX), can be hydrolyzed with dilute acid such as hydrochloric acid to form the corresponding free 21-hydroxy derivatives, namely 9α-hydroxycortisone (XXII), 9α-methoxycortisone (XXIII), 9α-ethoxycortisone (XXIV), and 9α-acetoxycortisone (XXV).

The invention may be variously otherwise embodied within the scope of the appended claims.

I claim:

1. The process for producing a steroid of the pregnane series which comprises reacting a steroid of the general formula

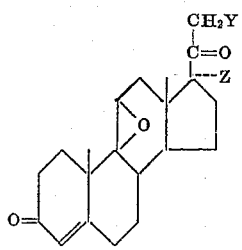

wherein Y is selected from the group consisting of hydroxy, halogen, hydrogen and lower alkanoyloxy, and Z is selected from the group consisting of hydrogen and alpha-hydroxy, with a compound selected from the group consisting of lower alkanols, and lower alkanoic acids and recovering the product produced.

2. The process of claim 1, wherein the reaction is carried out in the presence of a strong acid.

3. The process of claim 2 wherein the strong acid is perchloric acid.

4. The process of preparing 9α-methoxyhydrocortisone acetate which comprises reacting $\Delta^4$-pregnene-9β,11β-oxido-17α,21-diol-3,20-dione acetate with methanol.

5. The process for preparing 9α-ethoxyhydrocortisone acetate which comprises reacting $\Delta^4$-pregnene-9β,11β-oxido-17α,21-diol-3,20-dione acetate with ethanol.

6. The process for preparing 9α-acetoxyhydrocortisone acetate which comprises reacting $\Delta^4$-pregnene-9β,11β-oxido-17α-21-diol-3,20-dione acetate with glacial acetic acid.

References Cited in the file of this patent

UNITED STATES PATENTS

| | | |
|---|---|---|
| 2,183,589 | Reichstein | Dec. 19, 1939 |
| 2,312,344 | Logemann | Mar. 2, 1943 |

FOREIGN PATENTS

| | | |
|---|---|---|
| 894,117 | Germany | Oct. 22, 1953 |

OTHER REFERENCES

Heymann et al.: Jour. Am. Chem. Soc. 73, pp. 5252–65 (1951).

UNITED STATES PATENT OFFICE

CERTIFICATE OF CORRECTION

Patent No. 2,949,478  August 16, 1960

Josef Fried

It is hereby certified that error appears in the printed specification of the above numbered patent requiring correction and that the said Letters Patent should read as corrected below.

Column 2, line 59, for "17β-" read -- 17α- --; column 6, line 4, for "69.94" read -- 66.94 --.

Signed and sealed this 4th day of April 1961.

(SEAL)
Attest: ERNEST W. SWIDER
Attesting Officer

ARTHUR W. CROCKER
Acting Commissioner of Patents